United States Patent Office 3,425,802
Patented Feb. 4, 1969

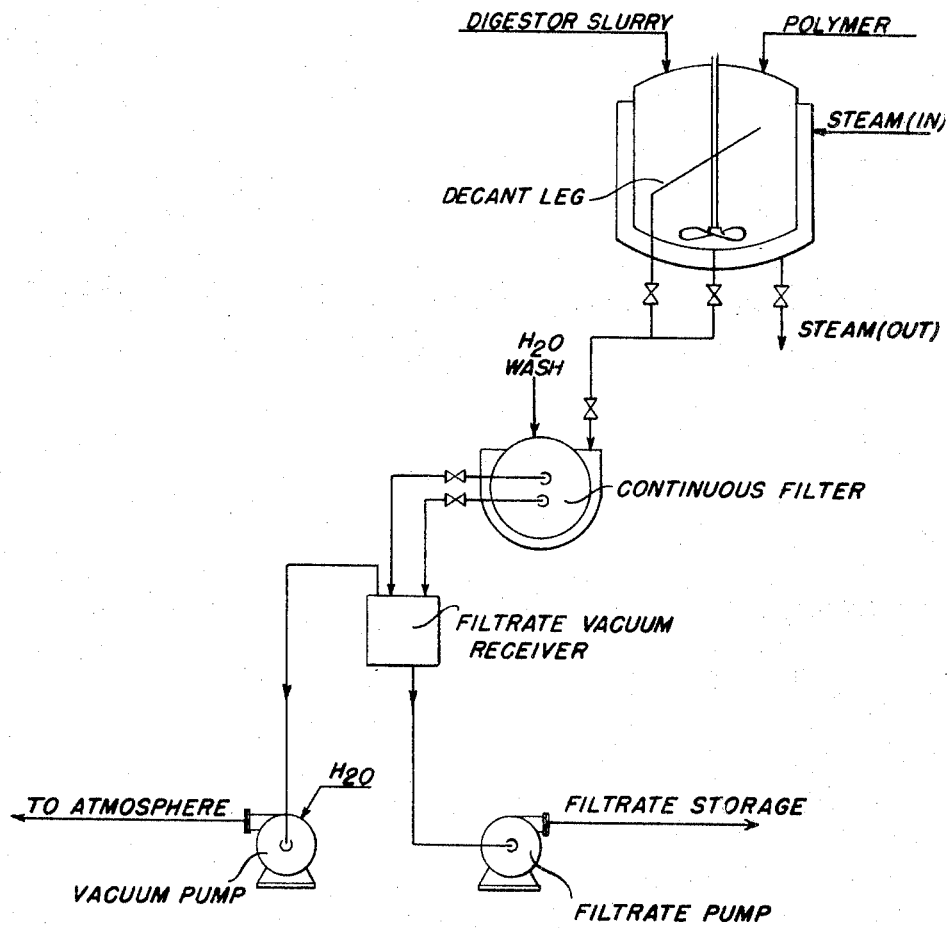

3,425,802
FLOCCULATION OF IMPURITIES IN ALUM SOLUTIONS
Robert Ben Booth, Stamford, Conn., assignor to American Cyanamid Company, Stamford, Conn., a corporation of Maine
Continuation-in-part of application Ser. No. 464,242, Oct. 25, 1954. This application Sept. 26, 1962, Ser. No. 226,348
U.S. Cl. 23—123
Int. Cl. C01f 7/74; B01d 21/00
7 Claims This application is a continuation-in-part of application Ser. No. 464,242, filed Oct. 25, 1954, Manufacture of Alum, Carl Edmund Skay, Robert Ben Booth and John Mitchell Dobson, now abandoned; and of application Ser. No. 399,836, filed Dec. 2, 1953, Robert Ben Booth and John Mitchell Dobson, Settling of Ore Pulps and Mineral Suspensions, now U.S. Patent No. 3,377,143, which in turn is a continuation-in-part of application Ser. No. 386,678, filed Oct. 16, 1953, Robert Ben Booth and John Mitchell Dobson, Settling of Acidic Ore Pulps and Mineral Suspensions, now abandoned, and application Ser. No. 296,082, filed June 27, 1952, Robert Ben Booth and John Mitchell Dobson, Settling of Ore Pulps and Mineral Suspensions, now abandoned; and of application Ser. No. 402,412, filed Jan. 5, 1954, Robert Ben Booth, Samuel P. Moyer and Otto R. Brown, Settling of Ore Pulps and Mineral Suspensions, now abandoned; which in turn is a continuation-in-part of application Ser. No. 378,428, filed Sept. 3, 1953, Robert Ben Booth, Samuel P. Moyer and Otto R. Brown, Settling of Ore Pulps and Mineral Suspensions, now abandoned.

This invention relates to an improvement in the manufacture of alum.

In the present-day process of manufacturing alum, an ore of alumina, e.g. bauxite, bauxitic clays, kaolin, etc., is crushed or ground to the necessary fineness and is sent to large digestors containing sulfuric acid where the ore is digested for several hours until the reaction between the ore and sulfuric acid is completed. In one preferred embodiment, the digestor slurry is then diluted to 8½% $Al_2O_3$ and is clarified by settling in open tanks for from 18 to 36 hours. The clear liquor is thereafter decanted and the settled muds are washed to remove as much of the soluble alum as is economically feasible. Losses in this operation range from 2.5% to 4.0% of the total yield. The settling and washing operations require many large settling tanks and long time cycles. The 8½% $Al_2O_3$ clarified liquor is thereafter concentrated by evaporation to 17% $Al_2O_3$. On cooling, the evaporated alum solidifies and is then usually crushed and ground for shipment.

One of the most serious problems confronting the alum manufacturer has always been the difficulty involved in clarifying the digestor slurry so that the soluble alum may be separated from the insoluble materials. It is well known that these digestor slurries are one of the most difficult materials to settle, and many attempts to improve the settling rates of such slurries have been made, as, for example, by the use of glue which is a common settling agent in alum manufacture. None of the proposals appear to have been wholly satisfactory, however, and the problem remains a serious one because even though glue appears to be on the present-day market as perhaps the most satisfactory settling agent, its action is not only too slow for satisfactory commercial operations, but unclarified supernatant liquids result, and, in addition, glue is too limited in its action in that it has little or no effect on certain alumina ores.

The present invention is based upon the discovery that the use of water-soluble acrylic polymers having at least 60% of the monomer units attached to amide groups are remarkably effective in the settling, agglomerating and thickening of the insolubles in the digestor slurries.

The acrylic polymers of the present invention serve to improve the settling rate of the insolubles in the digestor slurries to a remarkable degree. For example, it has been found that the settling of 100-ton batch digestor slurries to the same compression level may be accomplished in only 4–6 hours using an acrylic polymer of the present invention, whereas untreated slurries require 24 hours to settle to the same compression level.

In a more specific embodiment of the present invention, it has been found that the use of the acrylic polymers permits a continuous filtration of the alum liquors, a procedure which has not heretofore been possible on a plant scale with or without the use of the conventional settling agents.

The accompanying drawing represents a suitable flow sheet for the carrying out of a continuous filtration of the alum liquors in accordance with this aspect of the present invention. As will be obvious from an inspection of the drawing, there is provided a tank of suitable capacity for the settling of the digestor slurry. The supernatant liquor is continuously decanted and flows to the bowl of a continuous filter, which is, for example, a continuous filter of the precoated type equipped with a mat of diatomaceous earth as a filter medium containing either 10% or 20% fibrous asbestos. It is also possible to dispense with the precoat filter medium. In other words, it has been found that the action of the acrylic polymers is such that an agglomerated mass of the insolubles may be built up on the filter which serves the purpose admirably of the usual precoat filter medium. After filtration, the clear alum liquors are removed to storage as shown and the heavy muds may then be diluted, filtered to remove soluble alum and washed as described in more detail hereafter. It will also be obvious that centrifuging may be substituted for the continuous filtration of the alum liquors if desired.

By the use of the acrylic polymers in the continuous filtration process as described, it has been found that not only is it possible to increase the filtration rates to the order of 16 g.p.h. per square foot as compared with a filtration rate of 8 g.p.h. per square foot with untreated alum liquors, but, in addition, the overall alum loss in the continuous process using the acrylic polymers has been reduced to 0.3% or less.

The polymers useful in either the batch settling procedure or continuous filtration and continuous thickening procedures are water-soluble acrylic polymers having at least 60% of the monomer units attached to amide groups. Operable polymers having the necessary ratio of amide groupings are, for example, polyacrylamide, acrylic acid-acrylamide copolymers, alkali-hydrolyzed polyacrylamides and acid-hydrolyzed polyacrylonitriles. Acrylic polymers of the above class of high, low or medium viscosities, or molecular weight ranges, have been used satisfactorily. The molecular weight of these polymers should be at least about 10,000 in order to secure satisfactory results. Acrylic polymers having molecular weights upwards of 500,000–1,000,000 to at least 20,000,000 may be used satisfactorily. The polymers must in any event be water-soluble or water-dispersible.

Acrylic polymers useful in the present invention may be obtained by polymerizing monomeric acrylamide, for example. Products containing as much as 99% of their monomer units attached to amide groupings are often obtained by polymerization, with the remaining monomer units attached to carboxylic groups or possibly nitrile groups in some cases. Pure polyacrylamide will, of course, have no carboxyl groups but the commercial product frequently contains from 1 to 3% carboxyl groupings. Operable polyacrylamides in the present invention are those in which the ratio of amide groupings to carboxylic or other groupings varies from that of high-grade polyacrylamide, that is, either the pure 100% material, or the commercial product containing about 97 to 99% amide and 1 to 3% carboxyl, down to about 60:40.

The acid-hydrolyzed polyacrylonitriles are preferably prepared by heating polyacrylonitrile in concentrated sulfuric acid at 70–80° C. so as to form an acrylic polymer wherein about 70–75% of the nitrile groups are hydrolyzed to amide groups, the resulting products being closely similar to ordinary polyacrylamide.

Copolymers of acrylic acid-acrylamide may be prepared by copolymerizing monomeric acrylic acid and acrylamide. Or, substantially similar polymers may be prepared by the alkaline hydrolysis of polyacrylamide wherein the hydrolysis of the amide groups to carboxylic acid groups may be carefully controlled so as to produce the requisite ratio of carboxyl to amide groups in the polymer.

With all of the foregoing acrylic polymers, we have found that if the percentage of carboxyl groups exceeds about 40%, the effectiveness of the polymers in the settling/filtration of the alum liquors diminishes greatly. Therefore, only such acrylic polymers having at least 60% of the monomer units attached to amide groups are contemplated herein.

The polymers are of the type

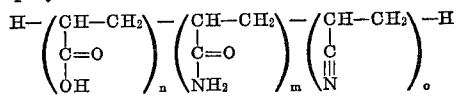

where $n$, $m$ and $o$ are whole numbers, and the groups within the parenthesis occur in random order and orientation. The residual value of $o$, for nitriloethylene groups, may be very small or zero. The values of $n$ and $m$ may be very large, for molecular weights of the order of 20,000,000. At least 60% of the groups should be carbamylethylene groups. The polymers can be termed polycarboxyethylene polycarbamylethylene polyelectrolytes.

The foregoing described polymers may be added to the digestor slurries at any convenient stage. Thus, in batch settling, they may be added prior to dilution of the slurry, or during or after dilution. In the filtration operation, the polymers are preferably added to the tank containing the digestor slurry. The polymers are preferably used in the form of a 10% water solution and in amounts ranging from about 0.5 lb. to 3.0 lbs. acrylic polymer per ton of dry solids.

The invention will be described in greater detail in conjunction with the following specific examples in which the parts are by weight unless otherwise specified.

EXAMPLE 1

600-gallon batches of raw digestor slurry containing 1.5–2.0% insolubles were pumped into an elevated jacketed tank as shown in the accompanying drawing. Steam was fed to the jacket in order to maintain the temperature of the slurry at 80–90° C. In separate runs, from 0.75 lb. to 3.0 lbs. real polyacrylamide per ton of dry solids were added to the slurry in the tank. Agitation was then started and was maintained for approximately 15 minutes. The settling period required approximately 1 hour with the temperature being maintained at 80–90° C. Convection currents set up in the tank due to temperature increased the settling of the insolubles and rendered a polish to the liquor. The agglomerated muds settled rapidly to the bottom of the tank leaving an almost clear supernatant polished liquor. After the holding period, the supernatant liquors were decanted from the tank by gravity and were passed into the bowl of the continuous filter as shown. In the continuous filter, the liquor was filtered to give a highly polished crystal-clear solution which was removed to storage. Filtration was continued down to the heavy muds. Approximately 80% of the liquor was decanted and filtered as clear polish liquor. The remaining muds in the tank were then diluted to the proper concentration (approximately 25° Bé.) consistent with ideal mud filtration conditions. The muds were agitated intermittently to keep them in suspension but not to the extent of causing a breakdown of the floc. The muds were thereafter drained from the bottom of the tank by gravity to the filter bowl of the continuous filter. Here the agglomerated muds were filtered, thoroughly washed and discarded, and the alum filtrate removed to storage or subsequently used in the process if desired.

EXAMPLE 2

From 2 lbs. to 9 lbs. real polyacrylamide were added in separate runs to 100-ton batches of sulfided digestor slurry. This corresponds to a usage of from 0.5 lb. to 3.0 lbs. of real polyacrylamide per ton of dry solids. The temperature of the slurry was maintained at 80–90° C. during the addition with vigorous mixing. The agitation was maintained for approximately 1–3 hours. The batches were then pumped to the settling tanks. The digestor slurry settled to a satisfactory compression level in approximately 4–6 hours and the alum solutions were clear and subsequent mud washings were completed without difficulty.

A similar 100-ton batch without the polyacrylamide treatment required 24 hours to settle the same compression level.

EXAMPLE 3

1,000 parts by volume samples of the acidic suspension (pH=3.0) resulting from the sulfuric acid-leaching of a bauxite ore were treated with polyacrylamide and settled for 90 minutes. Control tests without reagents and with glue, a standard settling agent for such suspensions, were also conducted. The results of these tests are given in the following table:

SETTLING TESTS ON LEACH LIQUORS

[Volume (cc.) of settled portions]

| Time, minutes | Polyacrylamide [1] lb./1,000 gallons | | | 0.85 lb. Glue per 1,000 gals.[1] | Blank |
| --- | --- | --- | --- | --- | --- |
| | 0.04 | 0.08 | 0.17 | | |
| Start | 1,000 | 1,000 | 1,000 | 1,000 | 1,000 |
| 10 | 980 | 920 | 800 | (²) | (³) |
| 20 | 850 | 800 | 560 | (²) | (³) |
| 30 | 770 | 725 | 495 | (²) | (³) |
| 40 | 720 | 660 | 452 | (²) | (³) |
| 50 | 675 | 595 | 425 | (²) | (³) |
| 60 | 640 | 550 | 405 | (²) | (³) |
| 75 | 595 | 500 | 385 | (²) | (³) |
| 90 | 560 | 470 | 370 | (²) | (³) |
| Condition of supernatant liquid | (⁴) | (⁴) | (⁴) | (⁵) | (⁶) |

[1] Polyacrylamide used was equivalent to 1.0–4.0 lb./ton of solids. Glue used was equivalent to 10.0 lb./ton of solids.
[2] Some incomplete flocculation noted as test progressed: slow incomplete settling.
[3] No flocculation noted: only coarse portions settled.
[4] Faintly cloudy.
[5] Clear.
[6] Very dirty.

The action of polyacrylamide is clearly demonstrated in the marked improvements in settling rates and clarity of the supernatant liquid.

The effect of polyacrylamide added in the above settling operation is carried over into subsequent washing operations as demonstrated in the following tests. Following the above-described settling operations, the supernatant liquid was siphoned off and the settled solids were then diluted back to the original volume with tap water and resettled as above. No additional polyacrylamide was used in this operation. The solids were observed to settle as follows:

LEACH LIQUORS
[Volume (cc.) of settled portions]

| Time, minutes | Polyacrylamide Molecular Weight | | | Acrylamide-Acrylic Acid Copolymer | Control |
|---|---|---|---|---|---|
| | Low | Medium | High | | |
| Start | 1,000 | 1,000 | 1,000 | 1,000 | 1,000 |
| 10 | 910 | 870 | 500 | 900 | (¹) |
| 20 | 820 | 700 | 390 | 780 | (¹) |
| 30 | 720 | 560 | 350 | 670 | (¹) |
| 40 | 630 | 500 | 320 | 570 | (¹) |
| 50 | 560 | 450 | 310 | 520 | (¹) |
| 60 | 520 | 420 | 295 | 500 | (¹) |
| 75 | 475 | 400 | 285 | 450 | (¹) |
| 90 | 445 | 380 | 275 | 425 | (¹) |
| 105 | 420 | 365 | 262 | 405 | (¹) |
| 120 | 410 | 350 | 260 | 390 | (¹) |
| Condition of supernatant liquid | (²) | (²) | (²) | (²) | (³) |
| Wash Liquors: | | | | | |
| Start | 1,000 | 1,000 | 1,000 | 1,000 | |
| 5 | 765 | 740 | 550 | 790 | |
| 10 | 600 | 560 | 395 | 630 | |
| 15 | 490 | 460 | 335 | 520 | |
| 20 | 430 | 420 | 300 | 465 | |
| 25 | 400 | 390 | 275 | 425 | |
| 30 | 370 | 370 | 260 | 405 | |
| 40 | 340 | 335 | 235 | 365 | |
| 50 | 315 | 310 | 220 | 340 | |
| 60 | 298 | 295 | 210 | 320 | |
| Condition of supernatant liquid | (²) | (²) | (²) | (²) | |

¹ No flocculation and only coarse portions settled.
² Clear.
³ Dirty.

SETTLING TESTS ON WASH LIQUORS
[Volume (cc.) of settled portions]

| Time, minutes | Polyacrylamide, lb./1,000 gallons¹ | | |
|---|---|---|---|
| | 0.04 | 0.08 | 0.17 |
| Start | 1,000 | 1,000 | 1,000 |
| 5 | 890 | 860 | 720 |
| 10 | 735 | 715 | 580 |
| 15 | 635 | 635 | 480 |
| 20 | 575 | 540 | 425 |
| 25 | 515 | 480 | 395 |
| 30 | 470 | 445 | 370 |
| 35 | 430 | 420 | 352 |
| 40 | 405 | 398 | 340 |
| 45 | 390 | 380 | 328 |
| Condition of supernatant liquid | (²) | | (³) |

¹ Polyacrylamide used was equivalent to 1.0–4.0 lb./ton of solids and was added in the first settling operation described above.
² Slightly cloudy.
³ Clear.

It will be noted that the settling rates were more rapid than observed for the leach liquors above. Floc formation was very rapid in the wash liquors. The effect of polyacrylamide added in the first settling operation was thus beneficially carried over into the washing-settling operation.

The same results were obtained with equivalent quantites of an acid-hydrolyzed polyacrylonitriles and an alkali-hydrolyzed polyacrylamide.

EXAMPLE 4

Settling tests were run on the acidic suspension resulting from the sulfuric acid leaching of a second bauxite ore. The testing method was similar to that described in Example 3. Polyacrylamides of low, medium and high molecular weight ranges and a copolymer of acrylamide-acrylic acid were used in amounts equivalent to 4.0 lb./ton of solids (about 0.17 lb./1000 gallons of suspension, and the solids were allowed to settle. The settling rates of the original leach liquors and wash liquors are given in the following table. It will be noted that improved settling rates were obtained in both cases and it was not necessary to use additional amounts of the polymers in the wash liquors to effect the indicated improved settling rates.

EXAMPLE 5

Filtration tests were conducted on 1000 parts by volume samples (pH=1.4) of the suspensions of acid-leached bauxite ore generally similar to that described in Example 3. Following the leaching operation the suspension was treated with an amount equivalent to 0.17 lb. polyacrylamide/1000 gallons and filtered. 770 parts by volume of the liquors were filtered off in 45 minutes. A control test (no polyacrylamide used) was conducted similarly; 560 parts by volume of the liquors were filtered off in 45 minutes in this test.

Filtration tests were conducted also on 1000 parts by volume samples of the wash liquors produced as described in Example 3. 960 parts by volume of filtrate were removed in 15.3 minutes. Wash liquors produced in a control test (no treatment) after a settling period of several hours were similarly filtered; for such liquors the filtration rate was slower and 40 minutes were required to remove 960 parts by volume of filtrate.

EXAMPLE 6

One liter of a 15% suspension of bauxite ore was treated with 0.007 lb./ton of the sodium salt of hydrolyzed polyacrylonitrile and allowed to settle 15 minutes. A comparison of the settling rate of this suspension and an untreated suspension are given in the following table:

| | Volume (ml.) of Supernatant Liquid | |
|---|---|---|
| | Treated | Untreated |
| Time (minutes): | | |
| 0 | 0 | 0 |
| 1 | 70 | 50 |
| 3 | 220 | 140 |
| 5 | 350 | 225 |
| 8 | 515 | 345 |
| 10 | 590 | 425 |
| 12 | 620 | 495 |
| 15 | 640 | 575 |

I claim:
1. In the process of manufacturing alum wherein the impure hot concentrated acidic alum solution resulting from the digestion of an ore of alumina with sulfuric acid is clarified by settling so as to remove the insolubles therefrom, the improvement which comprises clarifying the alum solution by adding thereto from about 0.5 lb. to about 3.0 lbs. per ton of dry solids of a water-soluble acrylic acid-acrylamide copolymer having at least 60% of the monomer units attached to amide groups, said co- polymer having an average molecular weight of at least 10,000.

2. In the process of manufacturing alum wherein the impure hot concentrated acidic alum solution resulting from the digestion of an ore of alumina with sulfuric acid is clarified by settling so as to remove the insolubles therefrom, the improvement which comprises clarifying the alum solution by adding thereto from about 0.5 lb. to about 3.0 lbs. per ton of dry solids of a water-soluble alkali-hydrolyzed polyacrylamide having at least 60% of the monomer units attached to amide groups, said copolymer having an average molecular weight of at least 10,000.

3. In the process of manufacturing alum wherein the impure hot concentrated acidic alum solution resulting from the digestion of an ore of alumina with sulfuric acid is clarified by settling so as to remove the insolubles therefrom, the improvement which comprises clarifying the alum solution by adding thereto from about 0.5 lb. to about 3.0 lbs. per ton of dry solids of a water-soluble acid-hydrolyzed polyacrylonitrile having at least 60% of the monomer units attached to amide groups, said copolymer having an average molecular weight of at least 10,000.

4. A continuous process of filtering hot concentrated acidic alum solutions which comprises adding from about 0.5 lb. to 3.0 lbs. per ton of dry solids of a water-soluble acrylic acid-acrylamide copolymer having at least 60% of the monomer units attached to amide groups, the polymer having a molecular weight of at least 10,000, to a tank containing an alum solution containing insolubles which settle to the bottom of the tank, continuously decanting the supernatant alum liquors, passing the liquors to a continuous filter, and continuously filtering the liquors so as to produce a highly polished, crystal-clear alum solution.

5. A continuous process of filtering hot concentrated acidic alum solutions which comprises adding from about 0.5 lb. to 3.0 lbs. per ton of dry solids of a water-soluble alkali-hydrolyzed polyacrylamide having at least 60% of the monomer units attached to amide groups, the polymer having a molecular weight of at least 10,000, to a tank containing an alum solution containing insolubles which settle to the bottom of the tank, continuously decanting the supernatant alum liquors, passing the liquors to a continuous filter, and continuously filtering the liquors so as to produce a highly polished, crystal-clear alum solution.

6. A continuous process of filtering hot concentrated acids alum solutions which comprises adding from about 0.5 lb. to 3.0 lbs. per ton of dry solids of a water-soluble acid-hydrolyzed polyacrylonitrile having at least 60% of the monomer units attached to amide groups, the polymer having a molecular weight to at least 10,000, to a tank containing an alum solution containing insolubles which settle to the bottom of the tank, continuously decanting the supernatant alum liquors, passing the liquors to a continuous filter, and continuously filtering the liquors so as to produce a highly polished, crystal-clear alum solution.

7. In the process of manufacturing alum wherein the impure hot concentrated acidic alum solution resulting from the digestion of an ore-containing aluminum with sulfuric acid is clarified by settling to remove the insolubles therefrom, the improvement which comprises clarifying the alum solution at a temperature of not less than about 60° C. by adding to said solution from about 0.5 lb. to about 3.0 lbs. per ton of dry solids of a water-soluble polyelectrolyte having the formula in acid form

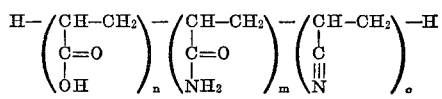

where $n$, $m$ and $o$ are whole numbers and $n$ and $m$ are each greater than zero and the groups within the parenthesis occur in random order and orientation and $m$ represents at least 60% of the total of $n$, $m$ and $o$, and having a molecular weight of at least about 10,000, settling and separating the insolubles of said liquid at a temperature of at least about 60° C. and evaporating and concentrating the thus clarified liquid.

References Cited

UNITED STATES PATENTS

| 1,359,037 | 11/1920 | Deane | 210—54 |
| 2,328,901 | 9/1943 | Grimm et al. | 260—72 |
| 2,354,648 | 8/1944 | Bond | 252—313 X |
| 2,685,369 | 8/1954 | Crossley | 210—54 |
| 2,740,522 | 4/1956 | Aimone et al. | 210—54 |

MICHAEL E. ROGERS, *Primary Examiner.*

U.S. Cl. X.R.

210—54

UNITED STATES PATENT OFFICE
CERTIFICATE OF CORRECTION

Patent No. 3,425,802                  February 4, 1969

Robert Ben Booth

It is certified that error appears in the above identified patent and that said Letters Patent are hereby corrected as shown below:

Column 1, line 17, "Dec. 2, 1953" should read -- Dec. 22, 1953 --; line 19, "3,377,143" should read -- 3,418,237 --. Column 5, in the table, third column, after line 10 thereof, insert -- (2) --; same table, in the footnote, line 1 thereof, "tin" should read -- ton --; same column 5, line 71, "suspension," should read -- suspension) --. Column 6, second table, first column, line 1 thereof, "Lime" should read -- Time --. Column 8, line 2, "acids" should read -- acidic --; line 32, "of", first occurrence, should read -- from --.

Signed and sealed this 7th day of April 1970.

(SEAL)

Attest:

Edward M. Fletcher, Jr.                WILLIAM E. SCHUYLER, JR.

Attesting Officer                        Commissioner of Patents